US009678475B2

(12) United States Patent
Richert et al.

(10) Patent No.: US 9,678,475 B2
(45) Date of Patent: Jun. 13, 2017

(54) SECURITY ELEMENTS AND METHOD FOR THEIR MANUFACTURE

(71) Applicant: BASF SE, Ludwigshafen (DE)

(72) Inventors: Michelle Richert, Illzach (FR); Roland Fleury, Zwingen (CH); Nikolay A. Grigorenko, Moehlin (CH); Frank Knocke, Ebersberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/423,843

(22) PCT Filed: Sep. 13, 2013

(86) PCT No.: PCT/EP2013/069006
§ 371 (c)(1),
(2) Date: Feb. 25, 2015

(87) PCT Pub. No.: WO2014/041121
PCT Pub. Date: Mar. 20, 2014

(65) Prior Publication Data
US 2015/0241845 A1 Aug. 27, 2015

Related U.S. Application Data

(60) Provisional application No. 61/701,738, filed on Sep. 17, 2012.

(30) Foreign Application Priority Data

Sep. 17, 2012 (EP) .................... 12184660

(51) Int. Cl.
G03H 1/02 (2006.01)
G02B 5/18 (2006.01)
G03H 1/18 (2006.01)
C09D 5/29 (2006.01)
G03H 1/28 (2006.01)
C09D 7/12 (2006.01)
B42D 25/328 (2014.01)
G03H 1/00 (2006.01)
G03H 1/26 (2006.01)

(52) U.S. Cl.
CPC ........... *G03H 1/182* (2013.01); *B42D 25/328* (2014.10); *C09D 5/29* (2013.01); *C09D 7/12* (2013.01); *C09D 7/1275* (2013.01); *C09D 7/1291* (2013.01); *G02B 5/18* (2013.01); *G02B 5/1833* (2013.01); *G03H 1/0011* (2013.01); *G03H 1/0256* (2013.01); *G03H 1/28* (2013.01); *G03H 2001/2635* (2013.01); *G03H 2250/43* (2013.01); *G03H 2260/33* (2013.01)

(58) Field of Classification Search
CPC ........ G03H 1/182; G03H 1/18; G03H 1/0011; G03H 1/00; G03H 1/28; G03H 1/0256; G03H 1/02; G03H 2260/33; G03H 2250/43; B42D 25/328; C09D 7/12; C09D 7/1291; C09D 7/1275; C09D 5/29
See application file for complete search history.

(56) References Cited

U.S. PATENT DOCUMENTS

| | | | |
|---|---|---|---|
| 3,658,526 A | 4/1972 | Haugh | |
| 3,862,333 A | 1/1975 | Chalupa et al. | |
| 3,993,485 A | 11/1976 | Chandross et al. | |
| 4,151,175 A | 4/1979 | Crivello et al. | |
| 4,399,071 A | 8/1983 | Crivello et al. | |
| 4,694,029 A | 9/1987 | Land | |
| 4,950,581 A | 8/1990 | Koike et al. | |
| 5,071,210 A * | 12/1991 | Arnold | G02B 5/32 359/15 |
| 5,128,223 A | 7/1992 | Gillberg-LaForce et al. | |
| 5,453,340 A | 9/1995 | Kawabata et al. | |
| 6,306,555 B1 | 10/2001 | Schulz et al. | |
| 6,646,771 B2 * | 11/2003 | Stevenson | 359/2 |
| 6,667,819 B2 * | 12/2003 | Nishikawa | G02B 5/0252 349/104 |
| 6,914,703 B2 | 7/2005 | Tomita | |
| 7,982,930 B2 * | 7/2011 | Kutsch et al. | 359/2 |
| 8,211,531 B2 * | 7/2012 | Schmid et al. | 428/203 |
| 8,993,219 B2 | 3/2015 | Richert et al. | |
| 2005/0037192 A1 * | 2/2005 | Argoitia et al. | 428/323 |

(Continued)

FOREIGN PATENT DOCUMENTS

DE 10 2010 026 925 A1 1/2012
EP 0 184 856 A2 6/1986

(Continued)

OTHER PUBLICATIONS easyRGB.com Webpage, color calculator results for CIE-L*ch data input, 1 page, (downloaded Oct. 30, 2015).*
International Search Report issued Sep. 12, 2013 in PCT/EP2013/069006.
European Search Report issued Jan. 23, 2013 in Patent Application No. 12 18 4660.
Office Action issued Jan. 26, 2016 in European Patent Application No. 13 762 481.3.

Primary Examiner — Martin Angebranndt
(74) Attorney, Agent, or Firm — Oblon, McClelland, Maier & Neustadt, L.L.P.

(57) ABSTRACT

The present invention relates to complex security elements based on recording materials for optical elements with refractive index modulation, in particular, holograms, which are subsequently coated with specific metallic nano-shaped metal particles, a method for their manufacture, in particular on a paper or on a plastic substrate and a security product obtainable using the security element. A further aspect of the invention is the use of such a security element for the prevention of counterfeit or reproduction of a document of value.

20 Claims, No Drawings

(56) References Cited

U.S. PATENT DOCUMENTS

| | | | |
|---|---|---|---|
| 2005/0058910 A1* | 3/2005 | Takizawa et al. | 430/1 |
| 2007/0058227 A1* | 3/2007 | Raksha et al. | 359/2 |
| 2007/0200002 A1* | 8/2007 | Raksha et al. | 235/491 |
| 2008/0295646 A1 | 12/2008 | Mirkin et al. | |
| 2009/0230670 A1* | 9/2009 | Schmid et al. | 283/85 |
| 2010/0086859 A1 | 4/2010 | Hayashida et al. | |
| 2010/0112458 A1* | 5/2010 | Knocke | 430/2 |
| 2010/0221646 A1 | 9/2010 | Kawamonzen et al. | |
| 2010/0266936 A1 | 10/2010 | Otaki et al. | |
| 2011/0199660 A1* | 8/2011 | Shirakura | 359/3 |
| 2011/0259243 A1* | 10/2011 | Schumacher | C09C 1/0024 106/417 |
| 2012/0183888 A1 | 7/2012 | Oliveira et al. | |
| 2012/0301639 A1 | 11/2012 | Grigorenko et al. | |
| 2013/0033032 A1* | 2/2013 | Degott et al. | 283/67 |
| 2013/0208327 A1 | 8/2013 | Bolle et al. | |
| 2015/0158323 A1* | 6/2015 | Richert et al. | 430/2 |

FOREIGN PATENT DOCUMENTS

| | | |
|---|---|---|
| EP | 0 324 480 A2 | 7/1989 |
| EP | 0 324 482 A2 | 7/1989 |
| EP | 0 329 102 A2 | 8/1989 |
| EP | 0 562 897 A1 | 9/1993 |
| EP | 0 624 826 A1 | 11/1994 |
| EP | 0 672 953 A2 | 9/1995 |
| EP | 1 033 623 A2 | 9/2000 |
| JP | 02-089081 * | 9/1988 |
| JP | 06-313812 * | 11/1994 |
| JP | 10-301276 A | 11/1998 |
| JP | 11-084995 * | 3/1999 |
| JP | 2008-268288 * | 11/2008 |
| WO | WO 90/01512 A1 | 2/1990 |
| WO | WO 97/44714 A1 | 11/1997 |
| WO | WO 98/46647 A1 | 10/1998 |
| WO | WO 03/102959 A1 | 12/2003 |
| WO | WO 2004/089813 A2 | 10/2004 |
| WO | WO 2005/051675 A2 | 6/2005 |
| WO | WO 2005/124456 A2 | 12/2005 |
| WO | WO 2005/124460 A1 | 12/2005 |
| WO | WO 2006/008251 A2 | 1/2006 |
| WO | WO 2006/099312 A2 | 9/2006 |
| WO | WO 2008/055807 A2 | 5/2008 |
| WO | WO 2009/056401 A1 | 5/2009 |
| WO | WO 2010/091795 A1 | 8/2010 |
| WO | WO 2010/108837 A1 | 9/2010 |
| WO | WO 2011/064162 A2 | 6/2011 |
| WO | WO 2012/007120 A1 | 1/2012 |
| WO | WO 2012/041851 A1 | 4/2012 |
| WO | WO 2012/176126 A1 | 12/2012 |
| WO | WO 2013/186167 A2 | 12/2013 |
| WO | 2012041121 * | 3/2014 |

* cited by examiner

SECURITY ELEMENTS AND METHOD FOR THEIR MANUFACTURE

The present invention relates to complex security elements based on recording materials for optical elements with refractive index modulation, in particular, holograms, which are subsequently coated with specific metallic nano-shaped metal particles, a method for their manufacture, in particular on a paper or on a plastic substrate and a security product obtainable using the security element. A further aspect of the invention is the use of such a security element for the prevention of counterfeit or reproduction of a document of value.

A phase hologram is characterized by a pattern of regions of different refractive indices within a recording material. Methods for producing holograms and the relevant theory may be found in the literature, for example in "Holography" by C. C. Guest (Encyclopedia of Physical Science and Technology, Vol. 6, pp. 507-519, R. A. Meyers, Ed., Academic Press, Orlando, Fla., 1987).

A variety of different materials are useful as recording material for holograms, for example, silver halide emulsions or cured dichromate-treated gelatine. A useful discussion of materials which have been known for some time may be found, for example, in "Holographic Recording Materials" by H. M. Smith, Ed. (Topics in Applied Physics, Vol. 20, Springer Verlag, 1977).

Photopolymers as recording material have also been known for some time. A distinction can, in principle, be made between those which have to be developed in a wet process and those which do not require a step of chemical development. The latter systems were described already in 1969 by Haugh in U.S. Pat. No. 3,658,526. They essentially consist of a polymeric binder, monomer and an initiator system and they are useful for recording highly resolved holograms. Since then, further monomer binder photopolymers have been described in the state of the art, which exhibit improved properties relative to the material originally described. DuPont now commercializes a holographic material under the trade mark OmniDex® (see EP 0 324 480).

The aforementioned photopolymer systems which contain a polymeric binder form an essentially solid film layer. In contrast thereto, binder-free systems have been described which are essentially liquid until exposure takes place (see for example U.S. Pat. No. 3,993,485 or N. Smirnova, Optics in Information Systems, February 2004, p. 9).

Specific photopolymerisable compositions, based on triglycerides are described in WO 2005/124456. A holographic recording material is disclosed which avoids most prior art disadvantages, such as long processing times and/or high shrinking of the cured polymer. The holographic elements produced from the recording material have a high refractive index modulation and exhibit high long-term stability, in particular, thermal and mechanical stability.

The above described phase holograms which are characterized by a pattern of regions of different refractive indices within a recording material are often referred to as volume holograms. In the context of the instant invention this term will be used as a synonym for phase holograms.

In contrast thereto there exist holograms which are produced differently, namely by preparing surface structures. These are referred to as embossed holograms.

WO 2005/051675, for example, is directed to a method for forming a holographic diffraction grating on a substrate by an embossing technique comprising the steps of: a) applying a curable compound to at least a portion of the substrate; b) contacting at least a portion of the curable compound with diffraction grating forming means; c) curing the curable compound and d) depositing a metallic ink on at least a portion of the cured compound.

WO 2011/064162 discloses the use of coating compositions for the production of security elements and holograms, comprising specifically shaped transition metal, especially silver, particles and a binder, wherein the ratio of pigment to binder is preferably such that the resulting coating shows an angle dependent color change.

It has now been found, that highly effective security elements can be produced when firstly a volume hologram is prepared and in a second step the volume hologram is coated with specific nano-shaped metal particles. The result is an angle dependent color change of the security element combined with the properties of a phase hologram which is characterized by a pattern of regions of different refractive indices (volume hologram).

The security element obtained exhibits a gold color in reflection on the printed surface, a green color in reflection viewing the volume hologram from the reverse side and a blue color in transmission. This effect cannot be achieved by using conventional pigments or dyes in combination with volume holograms. The effect is unique and cannot be counterfelted.

Due to the complex buildup of the security element and the variable optical effects resulting therefrom a high protection against counterfeit is possible, making the element ideally suitable for banknotes, credit cards and the like.

One aspect of the invention is a security element, comprising
 a) a substrate
 b) a component with refractive index modulation, in particular a volume hologram, which is obtainable by exposing a recording material to actinic radiation and thereon
 c) a coating comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm.

Elements with refractive index modulation are, in particular, holograms, transmission holograms as well as reflective holograms.

Holograms are generally made by allowing modulated radiation carrying holographic information to act on a layer of, for example, a photopolymerisable composition which has been applied to a substrate. The substrate may be transparent, translucent or opaque. Examples for suitable substrates are paper, plastic or glass.

Materials for producing volume holograms have been widely described in the literature. Examples have already been given above. These materials are partially items of commerce.

As already mentioned one of the first photopolymer materials has been commercialized by DuPont (EP0324482) under the trade name OmniDex®. Another company is Dai Nippon (US2010/0266936), who produces photopolymer holograms. Further companies which have been actively working in the field of photopolymer volume holograms are Polaroid (WO 97/44714), Nippon Paint (U.S. Pat. No. 5,453,340), Sony (EP0184856), Canon (EP0329102), Toshiba (US2010/0221646), TDK (US2010/0086859), Nissan (U.S. Pat. No. 6,914,703), Toppan (EP0672953), Lucent (EP1033623), Inphase (WO 03/102959) and Hoechst Celanese (U.S. Pat. No. 5,128,223).

Unexposed materials are available from Polygrama (US2012/0183888) and Bayer (WO 2010/091795 under the trade names Darol® (Polygrama), SM-Photopolymer® (Polygrama) and Bayfol HX® (Bayer).

Very suitable photopolymer compositions and the production of volume holograms therewith are described in WO 2005/124456, the disclosure of which is incorporated by reference.

Besides photopolymer materials silver halogenid films or dichromate layers may be used for the production of volume holograms. Suitable materials are available from HARMAN Technology Ltd. and ULTIMATE HOLOGRAPHY (Ultimate-08®).

Photopolymerisable materials are in general preferred for the production of volume holograms.

Photopolymerisable materials comprise at least one photoinitiator and one or more ethylenically unsaturated monomers or oligomers having generally from one to four unsaturated bonds.

Typically the photoinitiator is selected from benzophenone, alpha-hydroxy ketone type compounds, alpha-alkoxy ketone type compounds, alpha-amino ketone type compounds, mono and bisacylphosphine oxide compounds, phenylglyoxylate compounds, oxim ester compounds and onium salt compounds (sulfonium salt compounds and iodoinium salt compounds) and mixtures thereof.

For example the photoinitiator is selected from mono and bisacylphosphine oxide compounds, alpha-amino ketone type compounds, oxim ester compounds or mixtures thereof.

In a preferred embodiment the photoinitiator is selected from mono and bisacylphosphine oxide compounds and mixtures thereof.

Alternatively the curable composition comprises a mixture of a mono, or a bisacylphosphine oxide compound with a benzophenone compound, an alpha-hydroxy ketone, alpha-alkoxyketone, or alpha-aminoketone compound.

The, at present most preferred photoinitiators are mono and bisacylphosphine oxide compounds. Mono and bisacylphosphine oxide compounds can be used alone. Alternatively, a mixture of a mono and a bisacylphosphine oxide compound can be used, or the mono and bisacylphosphine oxide compounds can be used in admixture with other photoinitiators, such as, for example, the benzophenone type, alpha-amino ketone type, alpha-hydroxy ketone type, ketal compounds, phenylglyoxylate compounds, oxime ester compounds or onium salt compounds, especially a benzophenone compound, an alpha-hydroxy ketone, alpha-alkoxyketone, or alpha-aminoketone compound, very especially a benzophenone compound, an alpha-hydroxy ketone, or alpha-alkoxyketone compound. An alpha-aminoketone compound can be used, alone or in mixtures with other photoinitiators, if yellowing is not an issue.

Examples of photoinitiators are known to the person skilled in the art and for example published by Kurt Dietliker in "A compilation of photoinitiators commercially available for UV today", Sita Technology Textbook, Edinburgh, London, 2002.

Examples of suitable acylphosphine oxide compounds are of the formula XII

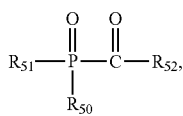

(XII)

wherein $R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;

or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{51}$ is —(CO)R'$_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;

$R_{52}$ and R'$_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;

$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl;

Specific examples are bis(2,4,6-trimethylbenzoyl)-phenylphosphine oxide (Irgacure® 819); 2,4,6-trimethylbenzoyl-diphenyl-phosphine oxide (Darocur®TPO); ethyl (2,4,6 trimethylbenzoyl phenyl) phosphinic acid ester; (2,4, 6-trimethylbenzoyl)-2,4-dipentoxyphenylphosphine oxide, bis(2,6-dimethoxybenzoyl)-2,4,4-trimethylpentylphosphine oxide.

Interesting further are mixtures of the compounds of the formula XII with compounds of the formula XI as well as mixtures of different compounds of the formula XII.

Examples are mixtures of bis(2,6-dimethoxybenzoyl)-2, 4,4-trimethylpentylphosphine oxide with 1-hydroxy-cyclohexyl-phenyl-ketone, of bis(2,4,6-trimethylbenzoyl)-phenylphosphine oxide with 2-hydroxy-2-methyl-1-phenylpropan-1-one, of bis(2,4,6-trimethylbenzoyl) phenylphosphine oxide with ethyl (2,4,6 trimethylbenzoyl phenyl) phosphinic acid ester, etc.

Examples of suitable benzophenone compounds are compounds of the formula X:

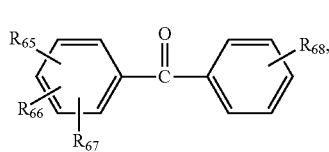

(X)

wherein $R_{65}$, $R_{66}$ and $R_{67}$ independently of one another are hydrogen, $C_1$-$C_4$alkyl, $C_1$-$C_4$-halogenalkyl, $C_1$-$C_4$alkoxy, Cl or $N(C_1$-$C_4$alkyl$)_2$;

$R_{68}$ is hydrogen, $C_1$-$C_4$alkyl, $C_1$-$C_4$halogenalkyl, phenyl, $N(C_1$-$C_4$alkyl$)_2$, $COOCH_3$,

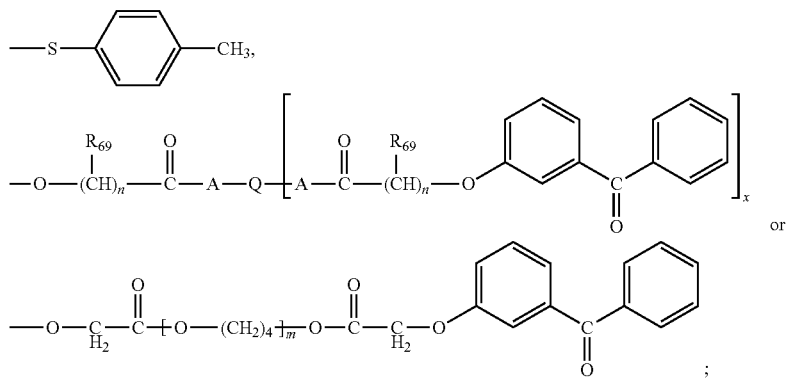

Q is a residue of a polyhydroxy compound having 2 to 6 hydroxy groups;

x is a number greater than 1 but no greater than the number of available hydroxyl groups in Q;

A is $-[O(CH_2)_bCO]_y-$ or $-[O(CH_2)_bCO]_{(y-1)}-[O(CHR_{71}CHR_{70})_a]_y-$;

$R_{69}$ is hydrogen, methyl or ethyl; and if N is greater than 1 the radicals $R_{69}$ may be the same as or different from each other;

a is a number from 1 to 2;
b is a number from 4 to 5;
y is a number from 1 to 10;
n is ; and
m is an integer 2-10.

Specific examples are Darocur®BP (=benzophenone), Esacure TZT® available from Lamberti, (a mixture of 2,4,6-trimethylbenzophenone and 4-methylbenzophenone), 4-phenylbenzophenone, 4-methoxybenzophenone, 4,4'-dimethoxybenzophenone, 4,4'-dimethylbenzophenone, 4,4'-dichlorobenzophenone, 4,4'dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio)benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, 4-benzoyl-N,N-dimethyl-N-[2-(1-oxo-2-propenyl)oxy]ethylbenzenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; biphenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxy-ethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phenoxy-phenyl)-methanone; 3-(4-benzoyl-phenyl)-2-dimethylamino-2-methyl-1-phenyl-propan-1-one; (4-chloro-phenyl)-(4-octylsulfanyl-phenyl)methanone; (4-chloro-phenyl)-(4-dodecylsulfanyl-phenyl)-methanone; (4-bromo-phenyl)-(4-octylsulfanyl-phenyl)-methanone; (4-dodecylsulfanyl-phenyl)-(4-methoxy-phenyl)methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenylsulfonyl)propan-1-one (Esacure®1001 available from Lamberti).

Examples of suitable alpha-hydroxy ketone, alpha-alkoxyketone or alpha-aminoketone compounds are of the formula (XI)

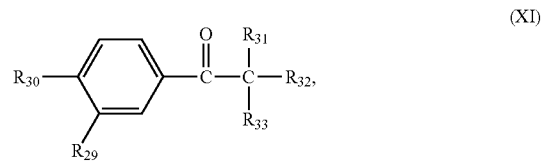

wherein $R_{29}$ is hydrogen or $C_1$-$C_{18}$alkoxy;

$R_{30}$ is hydrogen, $C_1$-$C_{18}$alkyl, $C_1$-$C_{12}$hydroxyalkyl, $C_1$-$C_{18}$alkoxy, $OCH_2CH_2-OR_{34}$, morpholino, $S$-$C_1$-$C_{18}$alkyl, a group $-HC=CH_2$, $-C(CH_3)=CH_2$,

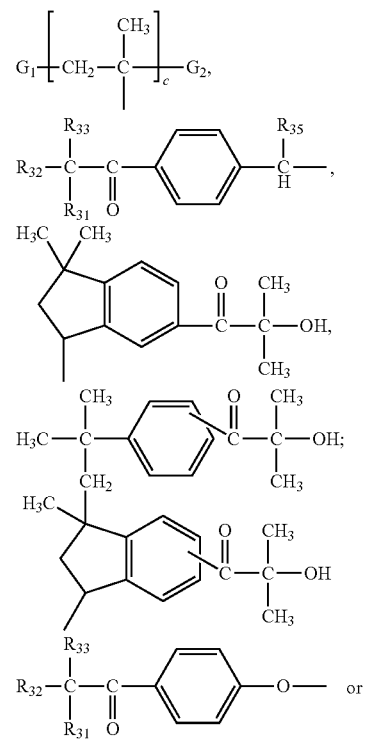

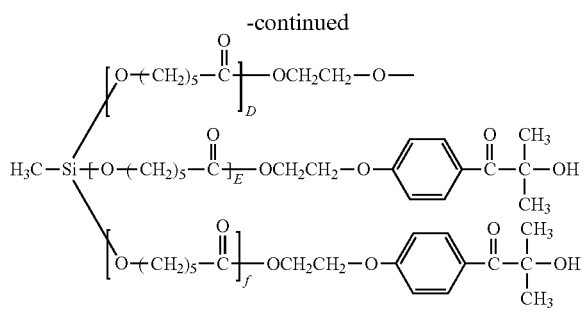

d, e and f are 1-3;
c is 2-10;
$G_1$ and $G_2$ independently of one another are end groups of the polymeric structure, preferably hydrogen or methyl;
$R_{34}$ is hydrogen,

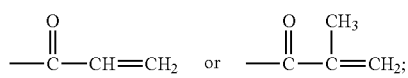

$R_{31}$ is hydroxy, $C_1$-$C_{16}$alkoxy, morpholino, dimethylamino or —O(CH$_2$CH$_2$O)$_g$—$C_1$-$C_{16}$alkyl;
g is 1-20;
$R_{32}$ and $R_{33}$ independently of one another are hydrogen, $C_1$-$C_6$alkyl, $C_1$-$C_{16}$alkoxy or —O(CH$_2$CH$_2$O)$_g$—$C_1$-$C_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;
$R_{35}$ is hydrogen, $OR_{36}$ or $NR_{37}R_{38}$;
$R_{36}$ is hydrogen, $C_1$-$C_{12}$alkyl which optionally is interrupted by one or more nonconsecutive O-atoms and which uninterrupted or interrupted $C_1$-$C_{12}$alkyl optionally is substituted by one or more OH, or $R_{36}$ is

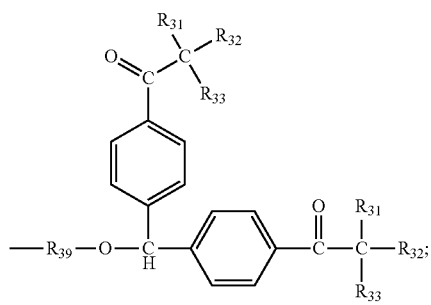

$R_{37}$ and $R_{38}$ independently of each other are hydrogen or $C_1$-$C_{12}$alkyl which is unsubstituted or is substituted by one or more OH;
$R_{39}$ is $C_1$-$C_{12}$alkylene which optionally is interrupted by one or more non-consecutive O, —(CO)—NH—$C_1$-$C_{12}$alkylene-NH—(CO)— or

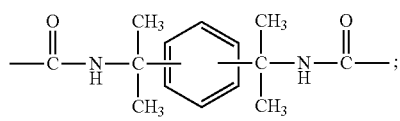

with the proviso that $R_{31}$, $R_{32}$ and $R_{33}$ not all together are $C_1$-$C_{16}$alkoxy or —O(CH$_2$CH$_2$O)$_g$—$C_1$-$C_{16}$alkyl.

Specific examples are 1-hydroxy-cyclohexyl-phenyl-ketone (Irgacure®184) or Irgacur® 500 (a mixture of Irgacure®184 with benzophenone), 2-methyl-1-[4-(methylthio)phenyl]-2-morpholinopropan-1-one (Irgacure®907), 2-benzyl-2-dimethylamino-1-(4-morpholinophenyl)-butan-1-one (Irgacure®369), 2-dimethylamino-2-(4-methyl-benzyl)-1-(4-morpholin-4-yl-phenyl)-butan-1-one (Irgacure®379), (3,4-dimethoxy-benzoyl)-1-benzyl-1-dimethylamino propane, 1-[4-(2-hydroxyethoxy)-phenyl]-2-hydroxy-2-methyl-1-propan-1-one (Irgacure®2959), 2,2-dimethoxy-1,2-diphenylethan-1-one (Irgacure®651), 2-hydroxy-2-methyl-1-phenyl-propan-1-one (Darocur®1173), 2-hydroxy-1-{4-[4-(2-hydroxy-2-methyl-propionyl)-benzyl]-phenyl}-2-methyl-propan-1-one (Irgacure® 127), 2-hydroxy-1-{4-[4-(2-hydroxy-2-methyl-propionyl)-phenoxy]-phenyl}-2-methyl-propan-1-one, Esacure KIP provided by Lamberti, 2-hydroxy-1-{1-[4-(2-hydroxy-2-methyl-propionyl)-phenyl]-1,3,3-trimethyl-indan-5-yl}-2-methyl-propan-1-one.

Irgacure® and Darocur® products are available from BASF SE.

Examples of suitable phenylglyoxylate compounds are of the formula XIII

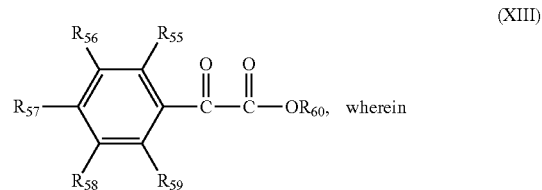

$R_{60}$ is hydrogen, $C_1$-$C_{12}$alkyl or

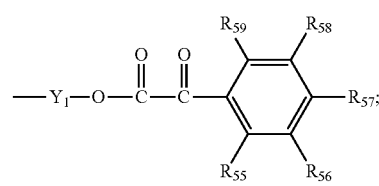

$R_{55}$, $R_{56}$, $R_{57}$, $R_{58}$ and $R_{59}$ independently of one another are hydrogen, unsubstituted $C_1$-$C_{12}$alkyl or $C_1$-$C_{12}$alkyl substituted by one or more OH, $C_1$-$C_4$alkoxy, phenyl, naphthyl, halogen or by CN; wherein the alkyl chain optionally is interrupted by one or more oxygen atoms; or $R_{55}$, $R_{56}$, $R_{57}$, $R_{58}$ and $R_{59}$ independently of one another are $C_1$-$C_4$alkoxy, $C_1$-$C_4$alkythio or $NR_{52}R_{53}$;

$R_{52}$ and $R_{53}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{52}$ and $R_{53}$ independently of one another are $C_2$-$C_{12}$-alkenyl, cyclopentyl, cyclohexyl, benzyl or phenyl; and $Y_1$ is $C_1$-$C_{12}$alkylene optionally interrupted by one or more oxygen atoms.

Specific examples of the compounds of the formula XIII are oxo-phenyl-acetic acid 2-[2-(2-oxo-2-phenyl-acetoxy)-ethoxy]-ethyl ester (Irgacure®754), methyl a-oxo benzeneacetate.

Examples of suitable oxime ester compounds are of the formula XIV

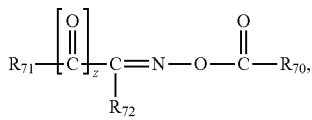
(XIV)

wherein
z is 0 or 1;
$R_{70}$ is hydrogen, $C_3$-$C_8$cycloalkyl; $C_1$-$C_{12}$alkyl which is unsubstituted or substituted by one or more halogen, phenyl or by CN; or $R_{70}$ is $C_2$-$C_5$alkenyl; phenyl which is unsubstituted or substituted by one or more $C_1$-$C_6$alkyl, halogen, CN, $OR_{73}$, $SR_{74}$ or by $NR_{75}R_{76}$; or $R_{70}$ is $C_1$-$C_8$alkoxy, benzyloxy; or phenoxy which is unsubstituted or substituted by one or more $C_1$-$C_6$alkyl or by halogen;
$R_{71}$ is phenyl, naphthyl, benzoyl or naphthoyl, each of which is substituted by one or more halogen, $C_1$-$C_{12}$alkyl, $C_3$-$C_8$cycloalkyl, benzyl, phenoxycarbonyl, $C_2$-$C_{12}$alkoxycarbonyl, $OR_{73}$, $SR_{74}$, $SOR_{74}$, $SO_2R_{74}$ or by $NR_{75}R_{76}$, wherein the substituents $OR_{73}$, $SR_{74}$ and $NR_{75}R_{76}$ optionally form 5- or 6-membered rings via the radicals $R_{73}$, $R_{74}$, $R_{75}$ and/or $R_{76}$ with further substituents on the phenyl or naphthyl ring; or each of which is substituted by phenyl or by phenyl which is substituted by one or more $OR_{73}$, $SR_{74}$ or by $NR_{75}R_{66}$;
or $R_{71}$ is thioxanthyl, or

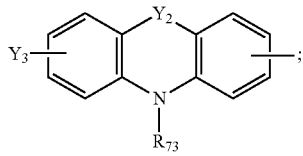

$R_{72}$ is hydrogen; unsubstituted $C_1$-$C_{20}$alkyl or $C_1$-$C_{20}$alkyl which is substituted by one or more halogen, $OR_{73}$, $SR_{74}$, $C_3$-$C_8$cycloalkyl or by phenyl; or is $C_3$-$C_8$cycloalkyl; or is phenyl which is unsubstituted or substituted by one or more $C_1$-$C_6$alkyl, phenyl, halogen, $OR_{73}$, $SR_{74}$ or by $NR_{75}R_{76}$; or is $C_2$-$C_{20}$alkanoyl or benzoyl which is unsubstituted or substituted by one or more $C_1$-$C_6$alkyl, phenyl, $OR_{73}$, $SR_{74}$ or by $NR_{75}R_{76}$; or is $C_2$-$C_{12}$alkoxycarbonyl, phenoxycarbonyl, CN, $CONR_{75}R_{76}$, $NO_2$, $C_1$-$C_4$haloalkyl, $S(O)_y$—$C_1$-$C_6$alkyl, or $S(O)_y$-phenyl, y is 1 or 2;
$Y_2$ is a direct bond or no bond;
$Y_3$ is $NO_2$ or

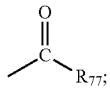

$R_{73}$ and $R_{74}$ independently of one another are hydrogen, $C_1$-$C_{20}$alkyl, $C_2$-$C_{12}$alkenyl, $C_3$-$C_8$cycloalkyl, $C_3$-$C_8$cycloalkyl which is interrupted by one or more, preferably 2, O, phenyl-$C_1$-$C_3$alkyl; or are $C_1$-$C_8$alkyl which is substituted by OH, SH, CN, $C_1$-$C_8$alkoxy, $C_1$-$C_8$alkanoyl, $C_3$-$C_8$cycloalkyl, by $C_3$-$C_8$cycloalkyl which is interrupted by one or more O, or which $C_1$-$C_8$alkyl is substituted by benzoyl which is unsubstituted or substituted by one or more $C_1$-$C_6$alkyl, halogen, OH, $C_1$-$C_4$alkoxy or by $C_1$-$C_4$alkylsulfanyl; or are phenyl or naphthyl, each of which is unsubstituted or substituted by halogen, $C_1$-$C_{12}$alkyl, $C_1$-$C_2$alkoxy, phenyl-$C_1$-$C_3$alkyloxy, phenoxy, $C_1$-$C_{12}$alkylsulfanyl, phenylsulfanyl, $N(C_1$-$C_{12}$alkyl$)_2$, diphenylamino or by

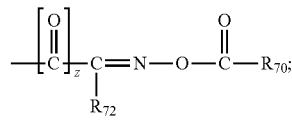

$R_{75}$ and $R_{76}$ independently of each other are hydrogen, $C_1$-$C_{20}$alkyl, $C_2$-$C_4$hydroxyalkyl, $C_2$-$C_{10}$alkoxyalkyl, $C_2$-$C_5$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or by $C_1$-$C_{12}$alkoxy; or $R_{75}$ and $R_{76}$ together are $C_2$-$C_6$alkylene optionally interrupted by O or $NR_{73}$ and optionally are substituted by hydroxyl, $C_1$-$C_4$alkoxy, $C_2$-$C_4$alkanoyloxy or by benzoyloxy;
$R_{77}$ is $C_1$-$C_{12}$alkyl, thienyl or phenyl which is unsubstituted or substituted by $C_1$-$C_{12}$alkyl, $OR_{73}$, morpholino or by N-carbazolyl.

Specific examples are 1,2-octanedione 1-[4-(phenylthio)phenyl]-2-(O-benzoyloxime) (Irgacure® OXE01), ethanone 1-[9-ethyl-6-(2-methylbenzoyl)-9H-carbazol-3-yl]-1-(O-acetyloxime) (Irgacure® OXE02), 9H-thioxanthene-2-carboxaldehyde 9-oxo-2-(O-acetyloxime), ethanone 1-[9-ethyl-6-(4morpholinobenzoyl)-9H-carbazol-3-yl]-1-(O-acetyloxime), ethanone 1-[9-ethyl-6-(2-methyl-4-(2-(1,3-dioxo-2-dimethyl-cyclopent-5-yl)ethoxy)-benzoyl)-9H-carbazol-3-yl]-1-(O-acetyloxime) (Adeka N-1919), ethanone 1-[9-ethyl-6-nitro-9H-carbazol-3-yl]-1-[2-methyl-4-(1-methyl-2-methoxy)ethoxy)phenyl]-1-(O-acetyloxime) (Adeka NCI831), etc.

It is also possible to add cationic photoinitiators, such as benzoyl peroxide (other suitable peroxides are described in U.S. Pat. No. 4,950,581, column 19, lines 17-25), or aromatic sulfonium, phosphonium or iodonium salts, such as are described, for example, in U.S. Pat. No. 4,950,581, column 18, line 60 to column 19, line 10.

Suitable sulfonium salt compounds are of formula XVa, XVb, XVc, XVd or XVe

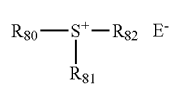
XVa

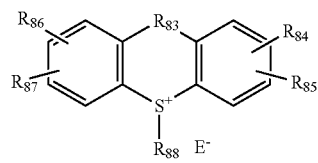
XVb

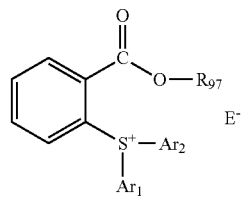
XVc

-continued

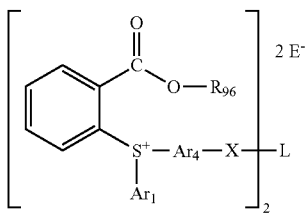
XVd

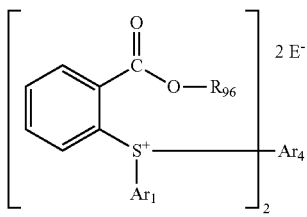
XVe wherein

R$_{80}$, R$_{81}$ and R$_{82}$ are each independently of the others unsubstituted phenyl, or phenyl substituted by —S-phenyl,

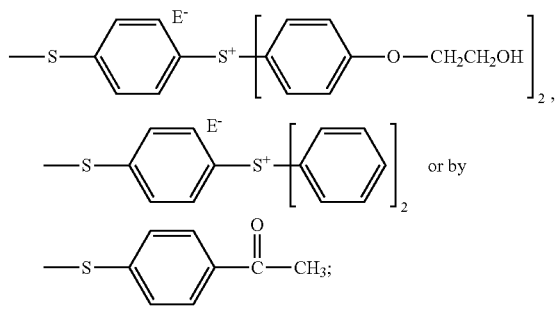

R$_{83}$ is a direct bond, S, O, CH$_2$, (CH$_2$)$_2$, CO or NR$_{89}$;

R$_{84}$, R$_{85}$, R$_{86}$ and R$_{87}$ independently of one another are hydrogen, C$_1$-C$_{20}$alkyl, C$_3$-C$_8$cycloalkyl, C$_1$-C$_{20}$alkoxy, C$_2$-C$_{20}$alkenyl, CN, OH, halogen, C$_1$-C$_6$alkylthio, phenyl, naphthyl, phenyl-C$_1$-C$_7$alkyl, naphtyl-C$_1$-C$_3$alkyl, phenoxy, naphthyloxy, phenyl-C$_1$-C$_7$alkyloxy, naphtyl-C$_1$-C$_3$alkyloxy, phenyl-C$_2$-C$_6$alkenyl, naphthyl-C$_2$-C$_4$alkenyl, S-phenyl, (CO)R$_{89}$, O(CO)R$_{89}$, (CO)OR$_{89}$, SO$_2$R$_{89}$ or OSO$_2$R$_{89}$;

R$_{88}$ is C$_1$-C$_{20}$alkyl, C$_1$-C$_{20}$hydroxyalkyl,

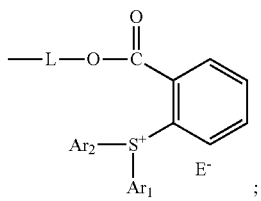

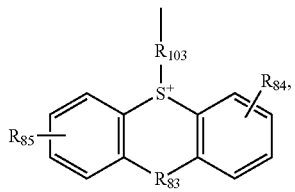

R$_{89}$ is hydrogen, C$_1$-C$_{12}$alkyl, C$_1$-C$_{12}$hydroxyalkyl, phenyl, naphthyl or biphenylyl;

R$_{90}$, R$_{91}$, R$_{92}$ and R$_{93}$ independently of one another have one of the meanings as given for R$_{84}$; or R$_{90}$ and R$_{91}$ are joined to form a fused ring system with the benzene rings to which they are attached;

R$_{95}$ is a direct bond, S, O or CH$_2$;

R$_{96}$ is hydrogen, C$_1$-C$_{20}$alkyl; C$_2$-C$_{20}$alkyl interrupted by one or more O; or is -L-M-R$_{98}$ or -L-R$_{98}$;

R$_{97}$ has one of the meanings as given for R$_{96}$ or is

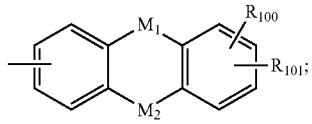

R$_{98}$ is a monovalent sensitizer or photoinitiator moiety;

Ar$_1$ and Ar$_2$ independently of one another are phenyl unsubstituted or substituted by C$_1$-C$_{20}$alkyl, halogen or OR$_{99}$;

or are unsubstituted naphthyl, anthryl, phenanthryl or biphenylyl;

or are naphthyl, anthryl, phenanthryl or biphenylyl substituted by C$_1$-C$_{20}$alkyl, OH or OR$_{99}$;

or are —Ar$_4$-A$_1$-Ar$_3$ or

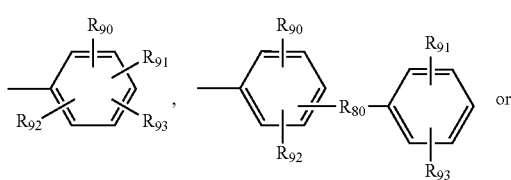

Ar$_3$ is unsubstituted phenyl, naphthyl, anthryl, phenanthryl or biphenylyl;

or is phenyl, naphthyl, anthryl, phenanthryl or biphenylyl substituted by C$_1$-C$_{20}$alkyl, OR$_{99}$ or benzoyl;

Ar$_4$ is phenylene, naphthylene, anthrylene or phenanthrylene;

A$_1$ is a direct bond, S, O or C$_1$-C$_{20}$alkylene;

X is CO, C(O)O, OC(O), O, S or NR$_{99}$;

L is a direct bond, S, O, C$_1$-C$_{20}$alkylene or C$_2$-C$_{20}$alkylene interrupted by one or more non-consecutive O;

R$_{99}$ is C$_1$-C$_{20}$alkyl or C$_1$-C$_{20}$hydroxyalkyl; or is C$_1$-C$_{20}$alkyl substituted by O(CO)R$_{102}$;

M$_1$ is S, CO or NR$_{100}$;

M$_2$ is a direct bond, CH$_2$, O or S;

R$_{100}$ and R$_{101}$ independently of one another are hydrogen, halogen, C$_1$-C$_8$alkyl, C$_1$-C$_8$alkoxy or phenyl;

R$_{102}$ is C$_1$-C$_{20}$alkyl; R$_{103}$

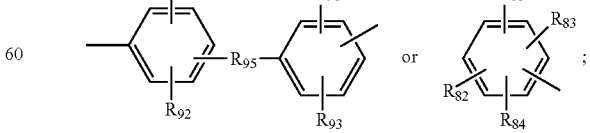

and

E is an anion, especially PF$_6$, SbF$_6$, AsF$_6$, BF$_4$, (C$_6$F$_5$)$_4$B, Cl, Br, HSO$_4$, CF$_3$—SO$_3$, F—SO$_3$,

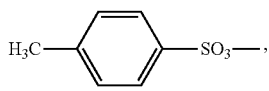

$CH_3—SO_3$, $ClO_4$, $PO_4$, $NO_3$, $SO_4$, $CH_3—SO_4$, or

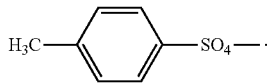

Specific examples of sulfonium salt compounds are for example Irgacure®270 (BASF SE); Cyracure® UVI-6990, Cyracure®UVI-6974 (Union Carbide), Degacure®KI 85 (Degussa), SP-55, SP-150, SP-170 (Asahi Denka), GE UVE 1014 (General Electric), SarCat®KI-85 (=triarylsulfonium hexafluorophosphate; Sartomer), SarCat® CD 1010 (=mixed triarylsulfonium hexafluoroantimonate; Sartomer); SarCat® CD 1011(=mixed triarylsulfonium hexafluorophosphate; Sartomer), Suitable iodonium salt compounds are of formula XVI

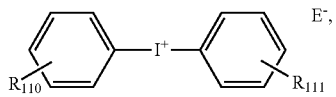

(XVI)

wherein $R_{110}$ and $R_{111}$ are each independently of the other hydrogen, $C_1$-$C_{20}$alkyl, $C_1$-$C_{20}$alkoxy, OH-substituted $C_1$-$C_{20}$alkoxy, halogen, $C_2$-$C_{12}$alkenyl, $C_3$-$C_8$cycloalkyl, especially methyl, isopropyl or isobutyl; and E is an anion, especially $PF_6$, $SbF_6$, $AsF_6$, $BF_4$, $(C_6F_5)_4B$, Cl, Br, $HSO_4$, $CF_3—SO_3$, $F—SO_3$,

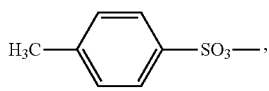

$CH_3—SO_3$, $ClO_4$, $PO_4$, $NO_3$, $SO_4$, $CH_3—SO_4$ or

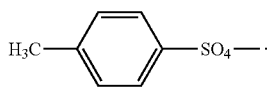

Specific examples of iodonium salt compounds are e.g. tolylcumyliodonium tetrakis(pentafluorophenyl)borate, 4-[(2-hydroxy-tetradecyloxy)phenyl]phenyliodonium hexafluoroantimonate or hexafluorophosphate, tolylcumyliodonium hexafluorophosphate, 4-isopropylphenyl-4'-methylphenyliodonium hexafluorophosphate, 4-isobutylphenyl-4'-methylphenyliodonium hexafluorophosphate (Irgacure®250, BASF SE), 4-octyloxyphenylphenyliodonium hexafluorophosphate or hexafluoroantimonate, bis(dodecylphenyl)iodonium hexafluoroantimonate or hexafluorophosphate, bis(4-methylphenyl)iodonium hexafluorophosphate, bis(4-methoxyphenyl)iodonium hexafluorophosphate, 4-methylphenyl-4'-ethoxyphenyliodonium hexafluorophosphate, 4-methylphenyl-4'-dode- cylphenyliodonium hexafluorophosphate, 4-methylphenyl-4'-phenoxyphenyliodonium hexafluorophosphate.

Of all the iodonium salts mentioned, compounds with other anions are, of course, also suitable. The preparation of iodonium salts is known to the person skilled in the art and described in the literature, for example U.S. Pat. Nos. 4,151,175, 3,862,333, 4,694,029, EP 562897, U.S. Pat. Nos. 4,399,071, 6,306,555, WO 98/46647 J. V. Crivello, "Photoinitiated Cationic Polymerization" in: UV Curing: Science and Technology, Editor S. P. Pappas, pages 24-77, Technology Marketing Corporation, Norwalk, Conn. 1980, ISBN No. 0-686-23773-0; J. V. Crivello, J. H. W. Lam, Macromolecules, 10, 1307 (1977) and J. V. Crivello, Ann. Rev. Mater. Sci. 1983, 13, pages 173-190 and J. V. Crivello, Journal of Polymer Science, Part A: Polymer Chemistry, Vol. 37, 4241-4254 (1999).

Halogen is fluorine, chlorine, bromine and iodine.

$C_1$-$C_{24}$alkyl ($C_1$-$C_{20}$alkyl, especially $C_1$-$C_{12}$alkyl) is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethyl-propyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl, or octadecyl. $C_1$-$C_8$alkyl is typically methyl, ethyl, n-propyl, isopropyl, n-butyl, sec.-butyl, isobutyl, tert.-butyl, n-pentyl, 2-pentyl, 3-pentyl, 2,2-dimethyl-propyl, n-hexyl, n-heptyl, n-octyl, 1,1,3,3-tetramethylbutyl and 2-ethylhexyl. $C_1$-$C_4$alkyl is typically methyl, ethyl, n-propyl, isopropyl, n-butyl, sec.-butyl, isobutyl, tert.-butyl.

$C_2$-$C_{12}$alkenyl ($C_2$-$C_5$alkenyl) groups are straight-chain or branched alkenyl groups, such as e.g. vinyl, allyl, methallyl, isopropenyl, 2-butenyl, 3-butenyl, isobutenyl, n-penta-2,4-dienyl, 3-methyl-but-2-enyl, n-oct-2-enyl, or n-dodec-2-enyl.

$C_1$-$C_{12}$alkoxy groups ($C_1$-$C_8$alkoxy groups) are straight-chain or branched alkoxy groups, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy and dodecyloxy.

$C_1$-$C_{12}$alkylthio groups ($C_1$-$C_8$ alkylthio groups) are straight-chain or branched alkylthio groups and have the same preferences as the alkoxy groups, except that oxygen is exchanged against sulfur.

$C_1$-$C_{12}$alkylene is bivalent $C_1$-$C_{12}$alkyl, i.e. alkyl having two (instead of one) free valencies, e.g. trimethylene or tetramethylene.

A cycloalkyl group is typically $C_3$-$C_8$cycloalkyl, such as, for example, cyclopentyl, cyclohexyl, cycloheptyl, or cyclooctyl, which may be unsubstituted or substituted.

In several cases it is advantageous in addition to the photoinitiator to employ a sensitizer compound. Examples of suitable sensitizer compounds are disclosed in WO 06/008251, page 36, line 30 to page 38, line 8, the disclosure of which is hereby incorporated by reference. As sensitizer inter alia benzophenone compounds as described above can be employed.

It is preferred that the recording material of component b) is a photopolymerisable composition comprising at least one ethylenically unsaturated monomer and/or oligomer and at least one photoinitiator.

In a preferred embodiment both, the recording material of component b) and the coating of component c) are photopolymerisable compositions comprising at least one ethylenically unsaturated monomer and/or oligomer and at least one photoinitiator.

Suitable photoinitiators have been described above.

Preferably the photoinitiator is selected from benzophenone, alpha-hydroxy ketone type compounds, alpha-alkoxy ketone type compounds, alpha-amino ketone type compounds, mono and bisacylphosphine oxide compounds, phenylglyoxylate compounds, oxim ester compounds and onium salt compounds (sulfonium salt compounds and iodoinium salt compounds) and mixtures thereof.

In another specific embodiment the photoinitiator comprises an arylborate and a dye as sensitizer.

WO-A-2005/124460 and WO-A-2005/124456 disclose photopolymerizable compositions comprising an ethylenically unsaturated monomer, a photoinitiator system, in particular a borate photoinitiator, a triglyceride and preferably a co-initiator (sensitizer) which is usually a dye, as well as the use of such compositions for preparing refractive index images, in particular holograms. Further suitable borate photoinitiators not concretely mentioned in WO-A-2005/124460 and WO-A-2005/124456 are given below. The compositions may also contain one or more of the borate photoinitiators listed below (the numbers in brackets are CAS numbers):

N,N,N-tributyl-1-butanaminium butyltriphenylborate (120307-06-4)
N-ethyl-N-[4-[1,5,5-tris[4-(diethylamino)phenyl]-2,4-pentadien-1-ylidene]-2,5-cyclohexadien-1-ylidene]-ethanaminium butyltriphenylborate (141714-54-7)
N,N,N-trimethyl-methanaminium, butyltriphenylborate (117522-01-7)
N,N,N-tributyl-1-butanaminium, butyltri-1-naphthalenylborate (219125-19-6)
N,N,N-tributyl-1-butanaminium, tris(3-fluorophenyl)hexylborate (191726-69-9)
N,N,N-tributyl-1-butanaminium, tris(3-fluorophenyl)(phenylmethyl)borate (199127-03-2)
dimethyl-(2-oxo-2-phenylethyl)-sulfonium, butyltriphenylborate (153148-27-7)
N,N,N-tributyl-1-butanaminium, tris(5-fluoro-2-methylphenyl)hexylborate (225107-27-7)
1-heptyl-2-[3-(1-heptyl-1,3-dihydro-3,3-dimethyl-2H-indol-2-ylidene)-1-propen-1-yl]-3,3-dimethyl-3H-indolium, butyltriphenylborate (117522-03-9)
Butyltriphenyl-borate, lithium (65859-86-1)

Suitable sensitizing dyes are, for example, Acridine orange, Acriflavine, Acriflavine hydrochloride, Alizarin and the like.

As mentioned above the photopolymerisable recording material may be commercially available. However, it is also possible to prepare a composition from commercially available monomers/oligomers and photoinitiators. Examples of materials are given below. These materials can also be used, when the coating, component c) is prepared from a photopolymerisable composition.

The photopolymerisable materials are typically curable lacquers which are cured by ultraviolet (U.V.) light. UV curing lacquers are commercial products and can be obtained, for example, from BASF SE. Particularly suitable for the lacquers compositions are chemistries used in the radiation curable industries in industrial coatings and graphic arts. Particularly suitable are compositions containing one or several photoinitiators that will initiate polymerization of the exposed lacquer layer to UV radiation. Particularly suitable for fast curing and conversion to a solid state are compositions comprising one or several monomers and oligomers sensitive to free-radical polymerization, such as acrylates, methacrylates or monomers or/and oligomers, containing at least one ethylenically unsaturated group.

The unsaturated compounds may include one or more olefinic double bonds. They may be of low (monomeric) or high (oligomeric) molecular mass. Examples of monomers containing a double bond are alkyl, hydroxyalkyl or amino acrylates, or alkyl, hydroxyalkyl or amino methacrylates, for example methyl, ethyl, butyl, 2-ethylhexyl or 2-hydroxyethyl acrylate, isobornyl acrylate, methyl methacrylate or ethyl methacrylate. Silicone acrylates are also advantageous. Other examples are acrylonitrile, acrylamide, methacrylamide, N-substituted (meth)acrylamides, vinyl esters such as vinyl acetate, vinyl ethers such as isobutyl vinyl ether, styrene, alkyl- and halostyrenes, N-vinylpyrrolidone, vinyl chloride or vinylidene chloride.

Examples of monomers containing two or more double bonds are the diacrylates of ethylene glycol, propylene glycol, neopentyl glycol, hexamethylene glycol or of bisphenol A, and 4,4'-bis(2-acryl-oyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, triallyl isocyanurate or tris(2-acryloylethyl) isocyanurate.

Examples of polyunsaturated compounds of relatively high molecular mass (oligomers) are acrylated epoxy resins, polyesters containing acrylate-, vinyl ether- or epoxygroups, and also polyurethanes and polyethers. Further examples of unsaturated oligomers are unsaturated polyester resins, which are usually prepared from maleic acid, phthalic acid and one or more diols and have molecular weights of from about 500 to 3000. In addition it is also possible to employ vinyl ether monomers and oligomers, and also maleate-terminated oligomers with polyester, polyurethane, polyether, polyvinyl ether and epoxy main chains. Of particular suitability are combinations of oligomers which carry vinyl ether groups and of polymers as described in WO90/01512. However, copolymers of vinyl ether and maleic acid-functionalized monomers are also suitable. Unsaturated oligomers of this kind can also be referred to as prepolymers.

Particularly suitable examples are esters of ethylenically unsaturated carboxylic acids and polyols or polyepoxides, and polymers having ethylenically unsaturated groups in the chain or in side groups, for example unsaturated polyesters, polyamides and polyurethanes and copolymers thereof, polymers and copolymers containing (meth)acrylic groups in side chains, and also mixtures of one or more such polymers.

Examples of unsaturated carboxylic acids are acrylic acid, methacrylic acid, crotonic acid, itaconic acid, cinnamic acid, and unsaturated fatty acids such as linolenic acid or oleic acid. Acrylic and methacrylic acid are preferred.

Suitable polyols are aromatic and, in particular, aliphatic and cycloaliphatic polyols. Examples of aromatic polyols are hydroquinone, 4,4'-dihydroxydiphenyl, 2,2-di(4-hydroxyphenyl)propane, and also novolaks and resols. Examples of polyepoxides are those based on the abovementioned polyols, especially the aromatic polyols, and epichlorohydrin. Other suitable polyols are polymers and copolymers containing hydroxyl groups in the polymer chain or in side groups, examples being polyvinyl alcohol and copolymers thereof or polyhydroxyalkyl methacrylates or copolymers thereof. Further polyols which are suitable are oligoesters having hydroxyl end groups.

Examples of aliphatic and cycloaliphatic polyols are alkylenediols having preferably 2 to 12 C atoms, such as ethylene glycol, 1,2- or 1,3-propanediol, 1,2-, 1,3- or 1,4-butanediol, pentanediol, hexanediol, octanediol, dodecanediol, diethylene glycol, triethylene glcyol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(P-hydroxyethyl)amine, trimethylolethane, trimethylolpropane, pentaerythritol, dipentaerythritol and sorbitol.

The polyols may be partially or completely esterified with one carboxylic acid or with different unsaturated carboxylic acids, and in partial esters the free hydroxyl groups may be modified, for example etherified or esterified with other carboxylic acids.

Examples of esters are: trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritolmodified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, or mixtures thereof.

Also suitable as polymerizable components are the amides of identical or different, unsaturated carboxylic acids with aromatic, cycloaliphatic and aliphatic polyamines having preferably 2 to 6, especially 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-β-aminoethyl ether, diethylenetriamine, triethylenetetramine, di(β-aminoethoxy)- or di(β-aminopropoxy)ethane. Other suitable polyamines are polymers and copolymers, preferably with additional amino groups in the side chain, and oligoamides having amino end groups.

Examples of such unsaturated amides are methylenebisacrylamide, 1,6-hexamethylenebisacrylamide, diethylenetriaminetrismethacrylamide, bis(methacrylamidopropoxy) ethane, β-methacrylamidoethyl methacrylate and N[(β-hydroxyethoxy)ethyl]acrylamide.

Suitable unsaturated polyesters and polyamides are derived, for example, from maleic acid and from diols or diamines. Some of the maleic acid can be replaced by other dicarboxylic acids. They can be used together with ethylenically unsaturated comonomers, for example styrene. The polyesters and polyamides may also be derived from dicarboxylic acids and from ethylenically unsaturated diols or diamines, especially from those with relatively long chains of, for example 6 to 20 C atoms. Examples of polyurethanes are those composed of saturated or unsaturated diisocyanates and of unsaturated or, respectively, saturated diols.

Polymers with (meth)acrylate groups in the side chain are likewise known. They may, for example, be reaction products of epoxy resins based on novolaks with (meth)acrylic acid, or may be homo- or copolymers of vinyl alcohol or hydroxyalkyl derivatives thereof which are esterified with (meth)acrylic acid, or may be homo- and copolymers of (meth)acrylates which are esterified with hydroxyalkyl (meth)acrylates.

Other suitable polymers with acrylate or methacrylate groups in the side chains are, for example, solvent soluble or alkaline soluble polyimide precursors, for example poly (amic acid ester) compounds, having the photopolymerizable side groups either attached to the backbone or to the ester groups in the molecule, i.e. according to EP624826. Such oligomers or polymers can be formulated with optionally reactive diluents, like polyfunctional (meth)acrylates in order to prepare highly sensitive polyimide precursors.

Examples of polymerizable components are also polymers or oligomers having at least two ethylenically unsaturated groups and at least one carboxyl function within the molecule structure, such as a resin obtained by the reaction of a saturated or unsaturated polybasic acid anhy-dride with a product of the reaction of an epoxy compound and an unsaturated monocarboxylic acid, for example, photosensitive compounds as described in JP 10-301276 and commercial products such as for example EB9696, UCB Chemicals; KAYARAD TCR1025, Nippon Kayaku Co., LTD., NK OLIGO EA-6340, EA-7440 from Shin-Nakamura Chemical Co., Ltd., or an addition product formed between a carboxyl group-containing resin and an unsaturated compound having an α,β-unsaturated double bond and an epoxy group (for example, ACA200M, Daicel Industries, Ltd.). Additional commercial products as examples of polymerizable component are ACA200, ACA210P, ACA230AA, ACA250, ACA300, ACA320 from Daicel Chemical Industries, Ltd.

The photopolymerizable compounds are used alone or in any desired mixtures. It is preferred to use mixtures of polyol (meth)acrylates. A preferred composition comprises at least one compound having at least one free carboxylic group.

As diluent, a mono- or multi-functional ethylenically unsaturated compound, or mixtures of several of said compounds, can be included in the above composition up to 70% by weight based on the solid portion of the composition.

The invention also provides compositions comprising as polymerizable component at least one ethylenically unsaturated photopolymerizable compound which is emulsified or dissolved in water, or organic solvents.

The unsaturated polymerizable components can also be used in admixture with non-photopolymerizable, film-forming components. These may, for example, be physically drying polymers or solutions thereof in organic solvents, for instance nitrocellulose or cellulose acetobutyrate. They may also, however, be chemically and/or thermally curable (heat-curable) resins, examples being polyisocyanates, polyepoxides and melamine resins, as well as polyimide precursors. The use of heat-curable resins at the same time is important for use in systems known as hybrid systems, which in a first stage are photopolymerized and in a second stage are crosslinked by means of thermal aftertreatment.

The polymerizable compositions may additionally comprise a solvent. The solvent may be ester/alcohol blends and preferably normal propyl acetate and ethanol. More preferably, the ester/alcohol blend is in a ratio of between 10:1 and 40:1, even more preferably 20:1 to 30:1. The solvent used may comprise any one or more of an ester, such as n-propyl acetate, iso-propyl acetate, ethyl acetate, butyl acetate; an alcohol, such as ethyl alcohol, industrial methylated spirits, isopropyl alcohol or normal propyl alcohol; a ketone, such as methyl ethyl ketone or acetone; an aromatic hydrocarbon, such as toluene, and water.

Although water may be used as a diluent alone, it is used in most cases together with an organic solvent such as an alcohol.

A photoinitiator, or a mixture of photoinitiators is incorporated into the formulation/composition to initiate the UV-curing process.

The lamp used in the method and apparatus of the present invention has emission peak(s) in the UV-A range (400 nm to 320 nm) and short wavelength visible spectrum (400-450 nm). That is, the lamp has emission peak(s) in the range of from 320 to 450 nm.

UV radiation is generally classed as UV-A, UV-B, and UV-C as follows: UV-A: 400 nm to 320 nm UV-B: 320 nm to 290 nm UV-C: 290 nm to 100 nm.

When a transparent substrate is used, the type of lamp is generally not critical. For example high or medium pressure mercury lamps are sufficient.

Any ultraviolet light source may be employed as a radiation source, such as, a high or low pressure mercury lamp, a cold cathode tube, a black light, an ultraviolet LED, an ultraviolet laser, and a flash light.

Examples of lamps, which can be used in the process of the present invention are shown below:

Medium pressure mercury arcs are modified by the inclusion of metal halides in small proportions to vary the spectral output:

iron doped—spectral output shifted to 350-450 nm;
gallium doped—emits very little UV; emission in the violet and blue spectral regions (expected additional UV lines by doping a mercury arc with metal iodides at wavelength/nm: Gallium (Ga) 403, 417 and Iron (Fe) 358, 372, 374/5, 382, 386, 388); and Focussed Reflected Diode Array (FRDA) systems (igb-tech GmbH), such as for example FRDA 202 having an emission peak around 400 nm. Multi-spectrum lamps can also be used.

Advantageously, a gallium, or iron doped medium pressure mercury arc is used in the context of the present invention to produce more efficiently UV-A (315-400 nm) or UV-B (280-315 nm) and to provide better radiant efficiency ranges and higher curing.

The curable/phptopolymerisable composition may comprise various additives. Examples thereof include thermal inhibitors, light stabilisers, optical brighteners, fillers and pigments, as well as white and coloured pigments, dyes, antistatics, adhesion promoters, wetting agents, flow auxiliaries, lubricants, waxes, anti-adhesive agents, dispersants, emulsifiers, anti-oxidants; fillers, e.g. talcum, gypsum, silicic acid, rutile, carbon black, zinc oxide, iron oxides; reaction accelerators, thickeners, matting agents, antifoams, leveling agents and other adjuvants customary, for example, in lacquer, ink and coating technology.

The curable/poptopolymerisable composition may comprise an epoxy-acrylate from the CRAYNOR® Sartomer Europe range, or the LAROMER® range available from BASF SE (10 to 60%) and one or several acrylates (monofunctional and multifunctional), monomers which are available from Sartomer Europe, or BASF SE (20 to 90%) and one, or several photoinitiators (1 to 15%) such as Irgacure® 819 (BASF SE) and a levelling agent such as BYK®361 (0.01 to 1%) from BYK Chemie.

Generally the photoinitiator is typically added in an amount of from 1% to 20%, preferably 3% to 10% by weight, based on the weight of the total photopolymerizable/curable composition.

When mixtures or sensitizers are used the above amounts apply to the total of components.

In a further embodiment of the present invention the photopolymerisable coating, component c) and the photopolymerizable recording material, component b) can be coloured. That is the curable/photopolymerisable composition may comprise pigments and/or dyes. The pigments can be transparent organic color pigments or inorganic pigments.

Suitable colored pigments especially include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoisoindolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof.

Colored organic pigments of particular interest include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, C.I. Pigment Green 36, the 2,9-dichloro-quinacridone in platelet form described in WO08/055807, or a mixture or solid solution thereof.

Platelet like organic pigments, such as platelet like quinacridones, phthalocyanine, fluororubine, dioxazines, red perylenes or diketopyrrolopyrroles can advantageously be used as further component.

Suitable colored pigments also include conventional inorganic pigments; especially those selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate, Prussian blue, $Fe_3O_4$, carbon black and mixed metal oxides. Examples of commercially available inorganic pigments are BAYFERROX® 3920, BAYFERROX® 920, BAYFERROX® 645T, BAYFERROX® 303T, BAYFERROX® 110, BAYFERROX® 110 M, CHROMOXIDGRUEN GN, and CHROMOXIDGRUEN GN-M.

Examples of dyes, which can be used to color the curable composition, are selected from the group consisting of azo, azomethine, methine, anthraquinone, phthalocyanine, dioxazine, flavanthrone, indanthrone, anthrapyrimidine and metal complex dyes. Monoazo dyes, cobalt complex dyes, chrome complex dyes, anthraquinone dyes and copper phthalocyanine dyes are preferred.

In a specific embodiment of the invention the coating, component c) of the security element comprises additionally an embossed surface relief microstructure, especially an optically variable image (an optically variable device, OVD).

The forming of an optically variable image in the coating of component c) comprises depositing a coating on at least a portion of the refractive index modulated layer.

The coating, generally an ink or lacquer may be deposited by means of gravure, flexographic, ink jet, offset and screen process printing as well as by coating processes. In lab scale experiments drawdowns with a wire bar or with a doctor blade are convenient.

Depending on the amount of solvent in the lacquer and depending on the printing process different dry coating thicknesses result. The weight ratio of metallic, particularly silver nano pigment to binder influences the resulting colors in transmittance and reflectance. Theoretically a pigment binder ratio (P:B) as given below leads to the outlined dry coating thickness.

|  | P:B ratio | | | |
| --- | --- | --- | --- | --- |
|  | 4:1 | 1:3 | 1:100 | 1:1000 |
| Coating thickness dry (micron) | 1.0 | 2.0 | 3.9 | 4.0 |

A UV coating thickness of between 1 and 4 micron is typical for the instant method.

Typically the metallic, particularly silver nano pigment to binder weight ratio is from 4:1 to 1:1000.

Optical microstructured images are composed of a series of structured surfaces (surface relief microstructures). These surfaces may have straight or curved profiles, with constant or random spacing, and may even vary from nanometers to millimetres in dimension. Patterns may be circular, linear, or have no uniform pattern. Embossed patterns may comprise microstructures having dimensions in the range from about 0.01 microns to about 100 microns. Light interference patterns based on microstructures having dimensions in the range from about 0.1 microns to about 10 microns, preferably about 0.1 microns to about 1 microns. For example a Fresnel lens has a microstructured surface on one side and a planar surface on the other. The microstructured surface consists of a series of grooves with changing slope angles as the distance from the optical axis increases. The draft facets located between the slope facets usually do not affect the optical performance of the Fresnel lens.

The optical interference pattern can take various conventional forms including diffraction patterns such as diffraction gratings, refraction patterns, holographic patterns such as twodimensional and three-dimensional holographic images, corner cube reflectors, Kinegram® devices (i.e., holograms with changing imagery as the angel of view is changed), Pixelgram® devices (i.e., a hologram with multiple holographic pixels arranged in a spatial orientation that generates one holographic image), zero order diffraction patterns, moire patterns, or other light interference patterns based on microstructures having dimensions in the range from about 0.1 microns to about 10 microns, preferably about 0.1 microns to about 1 microns, and various combinations of the above such as hologram/grating images, or other like interference patterns.

Such structures include, but are not limited to: (1) electron beam generated holograms; (2) dot matrix holograms; (3) computer generated holograms; (4) optically variable devices (OVDs); (5) diffractive optical variable devices (DOVIDs); (6) lenses, in particular micro lenses; (7) lenticular lenses; (8) non-reflective structures; (9) light management structures; (10) deep structures (e.g., structures that diffract only one wavelength at a very wide viewing angle, such as found in some butterflies and other insects); (11) radio frequency identification (RFID) antennas; (12) embossable computer chips; (13) retroreflective structures; (14) metallic-looking structures; ROVIDs (reflective optical variable devices).

The optically variable device (OVD) is, for example, a diffractive optical variable image (DOVI). The term "diffractive optical variable image" as used herein may refer to any type of holograms including, for example, but not limited to a multiple plane hologram (e.g., 2-dimensional hologram, 3-dimensional hologram, etc.), a stereogram, and a grating image (e.g., dot-matrix, pixelgram, exelgram, kinegram, etc.).

Typically the metal in the curable composition is selected from the group consisting of Cu, Ag, Au, Zn, Cd, Ti, Cr, Mn, Fe, Co, Ni, Ru, Rh, Pd, Os, Ir and Pt, preferably Ag and Cu.

Preferably, the particles comprise, silver and/or copper flakes.

Especially preferred is Ag.

The shaped transition metal particles have, for example, a longest dimension of edge length of from 5 to 1000 nm and a thickness of 1 to 100 nm and comprise hexagonal and/or triangular and/or truncated triangular prisms, which prisms make up more than 20% of the total number of shaped transition metal particles.

In a specific embodiment of the present invention, platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm are used. The production of the shaped transition metal particles is, for example, described in US2008/0295646, WO2004/089813, WO2006/099312, C. Xue et al., Adv. Mater. 19, 2007, 4071, WO2009056401 and WO2010/108837. The use of the platelet shaped transition metal particles for producing holograms is described in WO 2011/064162.

The coating compositions of component c) comprise a total content of shaped transition metal particles of from 0.1 to 90% by weight, preferably 1-20% by weight based on the total weight of the ink. The curable composition may additionally comprise a solvent. Typical solvents have already been mentioned. For example, the solvents may be ester/alcohol blends and preferably normal propyl acetate and ethanol. More preferably, the ester/alcohol blend is in a ratio of between 10:1 and 40:1, even more preferably 20:1 to 30:1. The solvent used in the curable composition may comprise any one or more of an ester, such as n-propyl acetate, iso-propyl acetate, ethyl acetate, butyl acetate; an alcohol, such as ethyl alcohol, methanol, methoxypropanol, industrial methylated spirits, isopropyl alcohol or normal propyl alcohol; a ketone, such as cyclohexanone, methyl ethyl ketone or acetone; an aromatic hydrocarbon, such as toluene, and water.

The platelet shaped (transition) metal particles may be used in combination with spherical (transition) metal particles, such as spherical (transition) metal particles having a diameter of ≤40 nm, especially ≤20 nm.

In another embodiment of the invention another metal pigment may be added. The metal pigment is a metal pigment produced by physical vapor deposition (PVD metal pigment). The operating range of vacuum deposition may be in the range of 5 to 50 nm, the preferred thickness of the metal particles is in the range of 8 to 21 nm. Preferably, the thickness of the metal pigment particles is less than 50 nm. More preferably, the thickness of metal pigment particle is less than 35 nm. More preferably still, the thickness of pigment particle is less than 20 nm. Even more preferably still, the thickness of pigment particle is in the range 5-18 nm.

If such metallic pigment mixtures are used the ratio between the metallic platelet pigment and the binder system is from 10:1 to 1:1000.

The security element of the instant invention comprises as component c) a coating comprising the above mentioned metal platelets and a binder. Preferably the binder is selected from the group consisting of nitrocellulose, ethyl cellulose, cellulose acetate, cellulose acetate propionate (CAP), cellulose acetate butyrate (CAB), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythyleneterephthalate, terpene phenol, polyolefin, silicone, cellulose, polyamide, polyester and rosin ester resins or is a photopolymerisable composition comprising at least one ethylenically unsaturated monomer and/or oligomer and at least one photoinitiator.

Examples for photoinitiators and binder components have already been given above.

The security element according to the invention contains a substrate which substrate comprises glass, plastic or paper.

The substrate may be transparent, translucent or opaque. As plastic substrate there come into consideration thermoplastic or crosslinked polymers.

With respect to the thermoplastic or crosslinked polymer, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly (vinyl chloride) (PVC), poly(vinyl butyral) (PVB), poly (vinyl alcohol) (PVA), poly(vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN)], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins (crosslinked resins) such as resol type phenolic resin, a urea resin, a melamine resin, a polyurethane resin, an epoxy resin, an unsaturated polyester and the like.

Thermoplastic polymers are preferred, in particular transparent or translucent thermoplastic polymers. For example, the transparent or translucent substrate is selected from polyester, polyvinyl chloride (PVC), polyethylene, polycarbonate, polypropylene or polystyrene.

The paper substrate may be a banknote, an identification document like a passport, an identification card, a driver's license, a packaging material, e.g. a label, folding carton, paper bag for pharmaceuticals, apparel, software, cosmetic, tobacco or any other product to be decorated or prone to counterfeiting or forgery.

A further aspect of the invention is a method for forming the security element described above, comprising the steps a) depositing a recording material on a substrate;
b) exposing the recording material to modulated actinic radiation carrying holographic information, thereby producing a volume hologram;
c) coating the volume hologram at least in part with a coating comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm.

For example the recording material, component b) has a thickness of from 0.1 m to 100 µm, preferably of from 5 µm to 25 µm in the dry or cured state.

For instance the coating, component c) has a thickness of from 0.2 µm to 50 µm, preferably of from 0.3 µm to 6 µm in the dry or cured state.

Typically the security element formed shows an angle dependent color change upon viewing.

Depending on the exact particle size, particle to binder ratio and thickness of the coating the color flop varies from orange to blue (particle size preferably 8-20 nm height and 15-40 nm diameter), from red to green (particle size preferably 8-20 nm height and 30-70 nm diameter) or from blue to gold (particle size preferably 7-17 nm height and 50-120 nm diameter).

The coating shows an angle dependent color change, i.e. a variation of color as a function of the viewing angle. An angle dependent color change can be obtained at a pigment/binder ratio of about 10:1 to about 1:100. The colors produced depend also on the pigment/binder ratio. The colors vary from violet to blue in transmission to silver to gold in reflection. Other colors can be observed under angles between.

If a surface relief microstructure is applied, for example the surface relief microstructure forming means is a shim which is selected from the group consisting of a nickel sleeve; a nickel plate; an etched, or laser imaged metallic drum, or other materials mounted on an opaque cylinder or metal cylinder containing the optical variable device (OVD image) on the surface.

In many cases it is also possible to use a shim which is made from a thermoplastic or duroplastic polymer.

Preferably the shim is a nickel plate mounted on an opaque cylinder or metal cylinder and containing the OVD image on the surface.

Another aspect of the invention is a security product comprising a security element as described above, which includes banknotes, credit cards, identification documents like passports, identification cards, drivers licenses, or other verification documents, pharmaceutical apparel, software, compact discs, tobacco packaging and other products or packaging prone to counterfeiting or forgery.

Yet a further aspect is the use of the security element as described above for the prevention of counterfeit or reproduction, on a document of value, right, identity, a security label or a branded good.

The resulting security product containing the volume hologram, the coating with metal platelets and optionally a surface relief microstructure may for example be overprinted by a clear or slightly colored coating. The volume hologram and the optional surface relief microstructure remain still visible. The coating may be a conventional solvent borne coating or a UV curable coating. Examples for the components of a UV curable coating have already been given above. Examples for binders of solvent borne coatings are nitrocellulose, alkyd resins or polyacrylate resins. In the case of solvent borne coatings an additional heat drying step becomes necessary to evaporate the solvent.

The definitions and preferences given above apply equally for all aspects of the invention.

The following examples illustrate the invention.

Preparation of Silver Platelets

The preparation is carried out according to example 1 of WO 2011/064162. The precipitate is dispersed in any solvent of choice, and includes water, methanol, ethylacetate, cyclohexanone, methoxypropanol to obtain a dispersion containing 20% of silver platelets.

The thus obtained platelets are used in the following application examples.

APPLICATION EXAMPLES

Photopolymer Materials:

Lumogen® OVD Primer 301 is a commercial UV curable product of BASF SE.

Irgacure® 2100 is a commercial photoinitiator of BASF SE.

Manufacture of a volume hologram, (reflexion hologram) is carried out according to WO2005/124456 Example 1, page 22 or on a film from Bayer, Bayfol HX® or Dupont, Omnidex®, Toppan, DNP Application Examples The color coordinates of the volume hologram are measured in reflexion and in transmission using a Colorimeter Konica Minolta CM3610-d-(Measurement-d8° geometry)

TABLE 1

Color Coordinates, Volume Hologram without coating (comparative)

| CIELab | L* | C* | h° |
|---|---|---|---|
| Reflexion over white | 91.5 | 8.1 | 89.8 |
| Reflexion over black | 49.7 | 19.4 | 147.7 |
| Transmission | 93.2 | 8.3 | 347.3 |

Example 1

UV Embossed Volume Hologram

The composition of the UV lacquer is shown below:

TABLE 2

UV varnish

| UV lacquer | % by weight |
|---|---|
| Tripropylene glycol diacrylate (TPGDA) | 1-25 |
| Dipropylene glycol diacrylate (DPGDA) | 30-45 |
| Ethoxylated trimethylol propane triacrylate (TMEOPTA) | 10-50 |
| Reactive tertiary amine | 1-15 |
| Photoinitiator blend | 5-9 |

Photoinitiator Blend

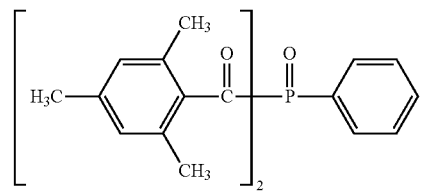

Bis(2,4,6,-trimethylbenzoyl)-phenylphosphine oxide 9 parts

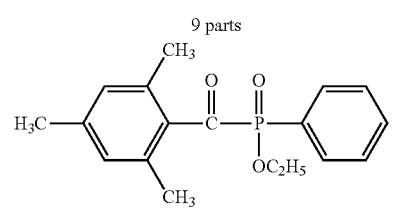

2,4,6,-Trimethylbenzoyl)-phenyl phosphinic acid ethyl ester 91 parts

UV Ink Preparation:

7 g UV varnish containing +5% Photoinitiator (% by weight, based on the total weight) are added to 3 g silver platelets dispersion (50% pigment in cyclohexanone) in a 20 mL glass bottle and gently stirred at room temperature. The obtained ink is coated by the means of a wire bar 0 (4 micron wet ink thickness) on a volume hologram manufactured according to WO2005/124456 on PET film and air dried. The coated film is pressed against a shim containing the holographic structure and is cured under UV light (Aktiprint® 18/2, 80 W/cm, 10 m/min) through the film. The PET film is peeled off the shim. The pigment to binder ratio of the ink corresponds to 1:5

The color coordinates of the volume hologram are measured in reflexion and in transmission using a Colorimeter Konica Minolta CM3610-d-(Measurement-d8° geometry)

TABLE 3

Color Coordinates, Volume Hologram with UV coating

| CIELab | L* | C* | h° |
|---|---|---|---|
| Coated side | | | |
| Reflexion over white | 37.7 | 16.9 | 345.3 |
| Reflexion over black | 33.1 | 14.7 | 23.7 |
| Uncoated side | | | |
| Reflexion over white | 46.8 | 17.1 | 167.9 |
| Transmission | 49.4 | 33.3 | 285.1 |

Effect obtained: UV embossed gold hologram on surface and green volume hologram on reverse side of the PET film, blue color in transmission.

Example 2

Nitrocellulose Ink

Ink Preparation:

28 g of nitrocellulose (DHM 10/25 IPA, 70% solids (Nobel Enterprises, UK)) are slowly added to 72.00 g of ethyl acetate (99-100% rein, Brenntag) in a 250 mL glass bottle and gently stirred until complete dissolution at room temperature. Solid content measurements are then performed and quantity of ethyl acetate is adjusted to achieve a value of 19.6% solid content in the varnish preparation. General procedure for metallic ink preparation: 10.0 g silver pigment dispersion (19.6% of the pigment particles obtained in ethylacetate) are added to 10 g above varnish in such a proportion as to adjust 1:1 the pigment to binder ratio. The obtained dispersion is stirred with a Dispermat at 800 rpm for 10 minutes affording a metallic ink which is coated by means of a wire bar 0 (4 micron wet ink thickness) on a volume hologram manufactured according to WO2005/124456 on PET film and air dried.

The color coordinates of the volume hologram on film are measured in reflexion and in transmission using a Colorimeter Konica Minolta CM3610-d-(Measurement-d8° geometry)

TABLE 4

| Color Coordinates, Volume Hologram with Nitrocellulose coating | | | |
|---|---|---|---|
| CIELab | L* | C* | h° |
| Coated side | | | |
| Reflexion over white | 43.4 | 24.1 | 58.4 |
| Reflexion over black | 43.7 | 32.4 | 70.3 |
| Uncoated side | | | |
| Reflexion over white | 57.4 | 22.9 | 124.4 |
| Reflexion over black | 57.3 | 27.4 | 120.9 |
| Transmission | 16.8 | 61.1 | 299.9 |

Effect obtained: Gold metallic color in reflexion on coated side of the volume hologram over white and over black, blue color in transmission and green volume hologram visible on uncoated side of the PET film.

The invention claimed is:

1. A security element, comprising:
   a) a substrate;
   b) a volume hologram formed in a refractive index modulated layer, which is obtained by holographically exposing a recording material to actinic radiation and thereon; and
   c) an embossed surface relief microstructure on at least a portion of the refractive index modulated layer,
   wherein the embossed surface relief microstructure comprises:
   platelet shaped transition metal particles, wherein the transition metal is Ag and/or Cu; and
   a binder,
   wherein the pigment to binder ratio is from 4:1 to 1:1000,
   the security element exhibits a gold color in reflection when viewed from the side of the embossed surface relief microstructure,
   a green color in reflection viewing the volume hologram from the unembossed reverse side, and
   a blue color in transmission, and
   wherein
   when the platelet shaped transition metal particles have a diameter from 15-40 nm and a height of 8-20 nm, the security element shows an angle dependent color change upon viewing from orange to blue,
   when the platelet shaped transition metal particles have a diameter from 30-70 nm and a height of 8-20 nm, the security element shows an angle dependent color change upon viewing from red to green, and
   when the platelet shaped transition metal particles have a diameter from 5-120 nm and a height of 7-17 nm, the security element shows an angle dependent color change upon viewing from blue to gold.

2. The security element according to claim 1, wherein the transition metal is Ag.

3. The security element according to claim 1, wherein the shaped transition metal particles comprise hexagonal, triangular, and/or truncated triangular prisms, wherein the prisms make up more than 20% of the total number of shaped transition metal particles.

4. The security element according to claim 1, wherein the binder is selected from the group consisting of nitrocellulose, ethyl cellulose, cellulose acetate, cellulose acetate propionate (CAP), cellulose acetate butyrate (CAB), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythyleneterephthalate, terpene phenol, polyolefin, silicone, cellulose, polyamide, polyester and rosin ester resins or is a photopolymerisable composition comprising an ethylenically unsaturated monomer and/or oligomer and a photoinitiator.

5. The security element according to claim 4, wherein the photoinitiator is selected from the group consisting of benzophenone, alpha-hydroxy ketone type compounds, alpha-alkoxy ketone type compounds, alpha-amino ketone type compounds, mono and bisacylphosphine oxide compounds, phenyiglyoxylate compounds, oxime ester compounds and onium salt compounds and mixtures thereof.

6. The security element according to claim 1, wherein the recording material of component b) is a photopolymerisable composition comprising an ethylenically unsaturated monomer and/or oligomer and a photoinitiator.

7. The security element according to claim 6, wherein the photoinitiator comprises an arylborate and a dye as sensitizer.

8. The security element according to claim 1, wherein both, the recording material of component b) and the coating of component c) are photopolymerisable compositions comprising an ethylenically unsaturated monomer and/or oligomer and a photoinitiator.

9. The security element according to claim 1, wherein the substrate comprises glass, plastic or paper.

10. A security product comprising a security element according to claim 1, wherein the security product is selected from the group consisting of banknotes, credit cards, identification documents, pharmaceutical apparel, software, compact discs, tobacco packaging and other products or packaging prone to counterfeiting or forgery.

11. A method for preventing counterfeit or reproduction, comprising applying the security element according to claim 1 on a document of value, right, identity, a security label or a branded good.

12. The security element according to claim 1, wherein the embossed surface relief comprises microstructures having dimensions in the range from about 0.01 microns to about 100 microns.

13. The security element according to claim 12, wherein the dimensions of the microstructures are in the range from about 0.1 microns to about 1 microns.

14. The security element according to claim 1, wherein the pigment to binder ratio is from 1:100 to 1:1000.

15. The security element according to claim 1, wherein the platelet shaped transition metal particles have a diameter from 15-40 nm and a height of 8-20 nm and the security element shows an angle dependent color change upon viewing from orange to blue.

16. The security element according to claim 1, wherein the platelet shaped transition metal particles have a diameter from 30-70 nm and a height of 8-20 nm and the security element shows an angle dependent color change upon viewing from red to green.

17. The security element according to claim 1, wherein the platelet shaped transition metal particles have a diameter from 5-120 nm and a height of 7-17 nm and the security element shows an angle dependent color change upon viewing from blue to gold.

18. A method for forming the security element of claim 1, the method comprising:
   a) depositing a recording material on a substrate;
   b) exposing the recording material to modulated actinic radiation carrying holo-graphic information, thereby producing a volume hologram; and
   c) coating the volume hologram at least in part with an embossed surface relief microstructure comprising:
      platelet shaped transition metal particles, wherein the transition metal is Ag and/or Cu; and
      a binder,
   wherein the pigment to binder ratio is from 4:1 to 1:1000, and
   wherein the platelet shaped transition metal particles have a diameter from 15-40 nm and a height of 8-20 nm and the security element shows an angle dependent color change upon viewing from orange to blue, the platelet shaped transition metal particles have a diameter from 30-70 nm and a height of 8-20 nm and the security element shows an angle dependent color change upon viewing from red to green, or the platelet shaped transition metal particles have a diameter from 5-120 nm and a height of 7-17 nm and the security element shows an angle dependent color change upon viewing from blue to gold.

19. The method according to claim 18, wherein the recording material, component b) has a thickness of from 0.1 µm to 100 µm in the dry or cured state.

20. The method according to claim 18, wherein the coating, component c) has a thickness of from 0.5 µm to 50 µm in the dry or cured state.

* * * * *